(No Model.)
H. L. MITCHELL.
COFFEE POT.
No. 603,700. Patented May 10, 1898.
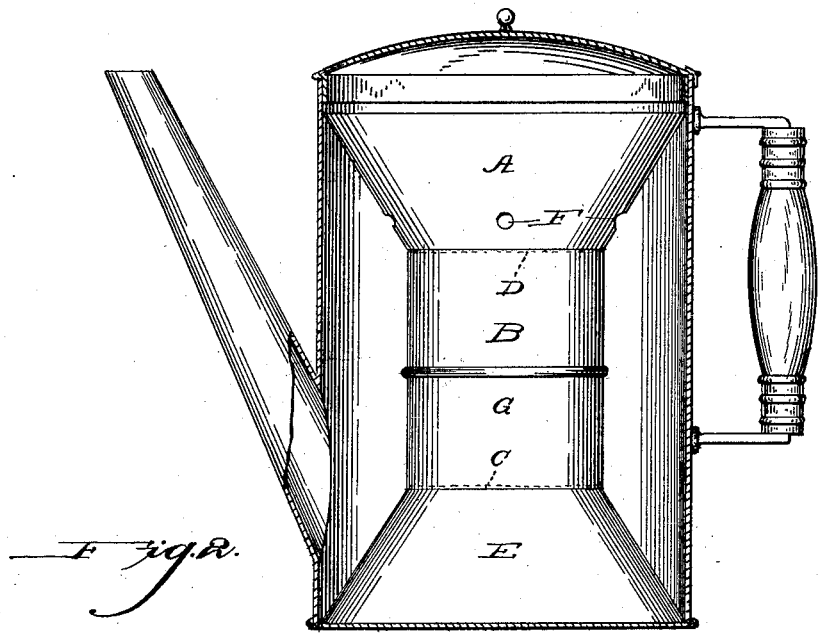
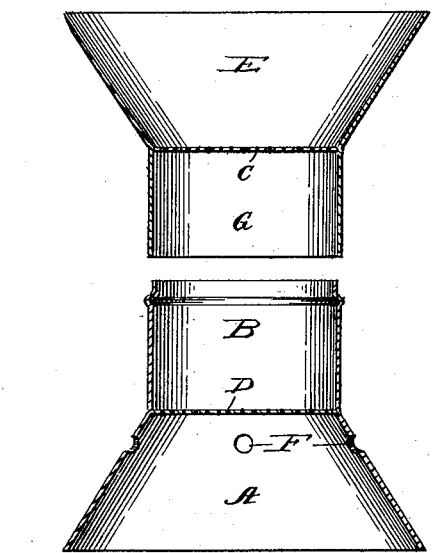
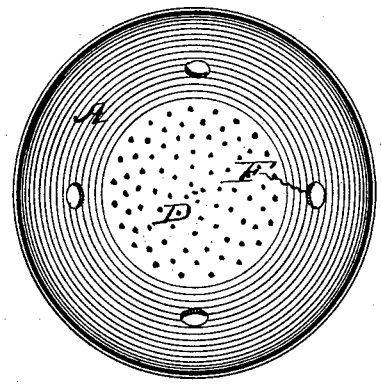
WITNESSES:
J. P. Appleman,
Carl Grimm.
INVENTOR
Herbert L. Mitchell,

UNITED STATES PATENT OFFICE.

HERBERT L. MITCHELL, OF PITTSBURG, PENNSYLVANIA.

COFFEE-POT.

SPECIFICATION forming part of Letters Patent No. 603,700, dated May 10, 1898.

Application filed October 27, 1897. Serial No. 656,613. (No model.)

*To all whom it may concern:*

Be it known that I, HERBERT L. MITCHELL, of Pittsburg, State of Pennsylvania, have invented a new and useful improvement in coffee-pots, and more particularly to a pot which is provided with an auxiliary receptacle within the pot proper, which is adapted to allow the boiling water and steam to pass through the grounds while cooking, thus percolating the grounds until the essence is extracted, of which the following is a specification.

My invention consists in the construction of parts, in connection with an ordinary coffee-pot, for producing coffee liquid, as will be more fully described hereinafter.

The accompanying drawings fully illustrate the process of my invention.

Figure 1 is a vertical sectional view of a coffee-pot embodying my invention. Fig. 2 is a sectional view of the same in its inverted position, showing the apparatus separated in its two sectional parts. Fig. 3 is an end view of the open conical chamber A, showing the openings F and the perforated partition D, which corresponds with the perforated partition C.

Similar letters of reference indicate corresponding parts in the different views.

A is a water-chamber with open end, provided with openings F and perforated bottom marked D, with coffee-chamber B, which is soldered to the conical chamber A. E is another water-chamber with open end, with perforated bottom marked C, with another portion of the coffee-chamber marked G, which flange is soldered to the water-chamber E. The flange G fits tightly over the flange B, thus confining the coffee-grounds between the perforated partitions C and D.

As the water boils it is forced up through the coffee-chamber into the upper water-chamber A through the holes in same, back again into coffee-pot, which causes a continuous circulation of the water through the grounds.

When desired, the apparatus can be lifted out of the coffee-pot, as all the parts are soldered together, except as shown in Fig. 2.

To make coffee without boiling, the apparatus can be inverted, as shown in Fig. 2. Then the water-chamber E acts as a funnel, through which the water is poured into the coffee-chamber.

The operation of my invention is as follows: To make a concoction of coffee, the two sections of the receptacle are separated, the coffee-grounds being placed in the section G. The other section of coffee-receptacle B is fitted on section G. Place the apparatus in the coffee-pot. The desired amount of water is poured into same and let boil until the desired strength is obtained. The other method is to make an infusion of coffee without boiling. In this instance the coffee-grounds should be placed in the section marked B. The section of receptacle G is fitted over the section B. The apparatus is then placed in the coffee-pot, with the water-chamber A, which contains the openings F at the bottom of the coffee-pot, after which boiling water should be poured into the upper portion of the apparatus and allowed to drip through the receptacle into the pot proper. The boiling water is poured into the water-chamber E, which passes through the perforation C into the coffee-chamber G and B, thence through the perforation D into the water-chamber A, and thence through the openings F into the coffee-pot. The water is then poured out through the spout of the coffee-pot into a vessel and returned to the water-chamber E again, this operation continuing until the desired strength is obtained.

What I claim as my invention, and desire to secure by Letters Patent, is as follows:

In an apparatus for brewing coffee, the combination with a coffee-pot, of an infuser comprising an annular conical section A, provided with the flange B, and perforated partition D, and openings F, of an annular conical section E, provided with a flange G and perforated partition C, said sections being adapted to be locked together by means of the flanges B and G, substantially as described.

HERBERT L. MITCHELL.

Witnesses:
CARL GRIMM,
CHARLES W. WESTERMAN.